United States Patent
Green

(10) Patent No.: US 6,326,916 B1
(45) Date of Patent: Dec. 4, 2001

(54) SIGNAL CONVERSION DEVICE FOR COUPLING RTCM CORRECTION DATA TO A POSITION DETERMINATION DEVICE

(75) Inventor: James C. Green, Los Altos, CA (US)

(73) Assignee: Trimble Navigation Limited, Sunnyvale, CA (US)

(*) Notice: Subject to any disclaimer, the term of this patent is extended or adjusted under 35 U.S.C. 154(b) by 0 days.

(21) Appl. No.: 09/120,961

(22) Filed: Jul. 22, 1998

(51) Int. Cl.[7] .............................. H04B 7/185; G01S 5/02
(52) U.S. Cl. .............................. 342/357.09; 342/357.1; 342/357.02
(58) Field of Search .................... 342/357.09, 357.1, 342/357.02

(56) References Cited

U.S. PATENT DOCUMENTS

| 5,477,228 | * | 12/1995 | Tiwari et al. . | |
|---|---|---|---|---|
| 5,877,725 | * | 3/1999 | Kalafus | 701/214 |
| 5,982,324 | * | 11/1999 | Watters et al. | 342/357.06 |
| 6,100,806 | * | 8/2000 | Gaukel | 340/573.4 |
| 6,137,675 | * | 10/2000 | Perkins | 361/679 |

* cited by examiner

Primary Examiner—Theodore M. Blum
(74) Attorney, Agent, or Firm—Wagner, Murabito & Hao LLP

(57) ABSTRACT

A signal conversion device that provides RTCM correction data to a position determination device. The signal conversion device receives RTCM signals that are converted into a frequency adapted to be received by a position determination device so as to produce a converted correction signal. In one embodiment, the signal conversion device also converts the received RTCM correction data into a format that is adapted to be received by the position determination device. In one embodiment, the received RTCM signal is converted into is the Wide Area Augmentation System (WAAS) format. Alternatively, the signal is converted into a different format such as a particular manufacturer's own format. The converted correction signal is coupled to a position determination device via a wireless link. The position determination device uses the RTCM correction data contained in the converted correction signal for accurately determining position.

15 Claims, 12 Drawing Sheets

_(US 6,326,916 B1)_

SIGNAL CONVERSION DEVICE FOR COUPLING RTCM CORRECTION DATA TO A POSITION DETERMINATION DEVICE

TECHNICAL FIELD

This invention relates to location determination systems. Specifically, the present invention relates to an apparatus and method for coupling correction signals to a position determination device for accurately determining position.

BACKGROUND ART

One class of position determination systems and devices determine the location of receivers using data broadcast by satellites. One constellation of satellites is the Global Positioning System (GPS). The GPS consists of a constellation of 24 orbiting satellites that transmit timing information and the satellite's ephemerides via microwave radio.

Position determination devices determine position by receiving the timing signals and ephemerides from four or more satellites. The timing information from each satellite is analyzed in order to determine the apparent distance from the position determination system to each satellite. The determination of apparent distance is made by measuring the time it takes for the signals to travel from each satellite to the receiver of the position determination system. These apparent distances are referred to as pseudoranges.

Pseudoranges are calculated by measuring the time it takes for the signal to travel from the satellite to the receiver. The satellites mark their transmissions digitally and the receiver compares the time it receives the time mark with its own time clock. The time delay, referred to as transit time, is typically in the range of about 70–90 milliseconds. Distance is then determined by multiplying transit time by the speed of radio transmissions (approximately 300,000,000 meters/second).

Since the ephemeride data includes the location of each satellite, position may be determined by a geometric calculation that uses the known satellite positions and calculated distances (pseudoranges). GPS based positions are calculated using the World Geodetic System of 1984 (WGS84) coordinate system. These positions are expressed in Earth Centered Earth Fixed (ECEF) coordinates of X, Y, and Z axes. These positions are often transformed into latitude, longitude, and height relative to the WGS84 ellipsoid.

One factor that introduces error into the process of determining location is atmospheric conditions. Another source of error results from the intentional introduction of error into the transmitted ephemerides and clock by the U.S. Air Force (referred to hereinafter as "selective availability" or "S/A"). The GPS navigation signals commonly available to civilian users are referred to as the standard positioning service (SPS). The accuracy of SPS is currently specified by the Department of Defense (DOD) to be within 100 meters horizontal position 95 percent of the time and 300 meters 99.99 percent of the time. Errors also result from atmospheric conditions. Though the specified horizontal accuracy may be adequate for some applications such as navigation of a vessel in the open ocean, other applications require an increased level of accuracy.

One method for obtaining accurate position that compensates for intentionally induced error and error due to atmospheric conditions is known as Differential GPS (DGPS). DGPS systems receive correction data broadcast from a DGPS reference station. A DGPS reference station is located at a fixed and known location. By using this information combined with the satellites' broadcast ephemerides, an actual range to each satellite is able to be determined. By differencing the received range measurement (pseudorange) with this calculated range, a correction to the pseudoranges received at other GPS receivers in the local area can be broadcast to those other receivers that are attempting to solve for their own local location. This correction includes all induced satellite clock errors and atmospheric (ionosphere, troposphere) errors.

DGPS systems typically determine position in one of two ways. Traditionally, positions have been calculated using code phase differential techniques. These are normally referred to as DGPS. More recently, carrier phase techniques have been used to determine position. These systems are referred to as Real Time Kinematic (RTK) systems.

DGPS reference stations may be dedicated facilities with permanent and/or extensive broadcast capabilities or may be simply a transient DGPS receiver with data transmitter located at a known location. DGPS reference stations transmit either their calculated corrections to the GPS signals or their actual observations of the GPS signals (raw data), or both. When transmitting calculated corrections, errors due to atmospheric (troposphere, ionosphere, etc.) and errors due to satellite timing/clock (both intentional and process noise) are represented by the correction value. The application of these corrections at a DGPS receiver will compensate for these error sources.

Differential GPS reference stations may also transmit their observations of the GPS signals for each satellite. This method of transmission is popular with RTK positioning techniques and systems due to the nature of typical RTK processing methods. When using this type of data format, errors associated with atmospherics and satellite timing/clock errors are removed at the moving/roving/differential GPS receiver. Most manufacturers of RTK systems typically broadcast this data in a format unique to the particular manufacture.

Other sources of correction data that include correction data for S/A and atmospheric conditions include broadcasts that conform to the Radio Technical Commission for Maritime services (RTCM) format. The RTCM has established standards describing format standards, communication bands, and messages for a differential correction GPS service. Correction data that conforms to the RTCM format is broadcast by the US Coast Guard and others to assist in maritime navigation. The US Coast Guard has regional DGPS reference stations that calculate and broadcast correction data using the RTCM format. The RTCM correction data broadcast by some US Coast Guard DGPS reference stations includes carrier phase observable data while data broadcast by other facilities only includes code phase correction data. However, irrespective of whether the particular US Coast Guard facility broadcasts carrier phase data or code phase correction data, the broadcast is typically in a standard RTCM format. Other agencies and port authorities throughout the world broadcast differential correction signals conforming to the RTCM format for navigation in and around coastal areas. Both raw observable data and RTCM "correction data" are referred to hereinafter as "correction data" since both forms of data allow for correction to be made to position.

FIG. 1 shows a prior art position determination system 10 for determining position using correction data originating from a DGPS Reference Station that transmits in a RTCM format. Position determination system 10 is shown to include housing 17 that contains beacon antenna 11 and beacon receiver 13. Housing 18 is shown to include GPS antenna 12 and GPS receiver 14. Both housing 17 and housing 18 are coupled to a third housing which contains DGPS processor 19 by electrical cable. Battery 15 is connected by electrical cable to DGPS processor 19 for providing electrical power to the components of position determination system 10. Data logger 16 is also shown to be coupled via electrical cable to DGPS processor 19. Data logger 16 typically includes a display and function keys so as to allow users to view output and to input data as required for the operation of position determination system 10. In operation, beacon antenna 11 receives differential correction signals from a Reference Station that broadcasts in a RTCM format and couples the signals to beacon receiver 13. Beacon receiver 13 demodulates the RTCM signals so as to obtain correction data which is then coupled to DGPS processor 19. GPS antenna 12 receives signals from satellites of the GPS and couples the signals to GPS receiver 14. GPS receiver 14 demodulates the signals from GPS satellites and processes the incoming data which is then coupled via electrical cable to DGPS processor 19. DGPS processor 19 then uses the data from beacon receiver 13 and GPS receiver 14 to accurately determine position.

Prior art position determination systems that use bulky housings that are connected via cable are difficult to transport and use. In addition, in many instances differential correction signals are not available or are not needed because a high level of accuracy is not required for a particular task. In these instances, a user must carry all of the different housings and components from place to place even though some of the features of the system are not required. In addition, different antennas and receivers are required for picking up the various different sources of correction data. For example, a position determination system having a receiver and antenna tuned to receive signals conforming to a particular manufacturer's format is used for determining position using correction data transmitted in a particular manufacturer's format. A separate position determination system that has a receiver and antenna tuned to receive RTCM signals is used to determine position using RTCM correction data.

One proposed new system for correcting position determination signals from satellites is the Wide Area Augmentation System (WAAS). The WAAS is designed for use with aircraft operations. The WAAS is designed to provide a system that has sufficient integrity such that position may be determined with sufficient reliability and accuracy for aircraft operations. The WAAS includes satellites for transmitting signals and a ground network that augments GPS such that GPS may be used as a primary navigation sensor for aircraft. The WAAS augments GPS with a ranging function, (which improves availability and reliability), differential GPS corrections (which improve accuracy), and integrity monitoring (which improve safety).

Prior Art FIG. 2 shows a proposed WAAS that includes WAAS satellite 4 that broadcasts GPS integrity and correction data, and a ranging signal that augments GPS. The WAAS ranging signal is GPS-like and may be received by slightly modified GPS receivers. More specifically, it will be at the GPS L1 frequency and will be modulated with a spread spectrum code from the same family as the GPS C/A codes. The code phase and carrier frequency of the signal is controlled so that the WAAS satellite will provide additional range measurements to a GPS user. The WAAS signal will also carry data that contains differential corrections and integrity information for all GPS satellites, as well as for the geostationary WAAS satellite 4.

The ground network shown in FIG. 2 accumulates differential corrections and integrity data at wide area Reference Stations (WRS) 2 that are widely dispersed. WRS 2 process the raw data received from GPS satellites to determine integrity, differential corrections, residual errors, and ionospheric delay information for each monitored satellite. They also develop ephemeris and clock information for the WAAS geostationary satellite 4. All of this data is accumulated at Wide area Master Site (WMS) 3 and is packaged into the WAAS message that is uplinked to the WAAS geostationary satellite 4 that broadcasts the WAAS signal. Aircraft such as aircraft 5 receive signals from GPS satellites such as GPS satellite 1 and receive the WAAS signal that then allows for accurately determining the position of aircraft 5. The WAAS signal does not interfere with GPS signals because the received WAAS signal has approximately the same power as GPS signals, and Code Division Multiple Access (CDMA) is used to share the L1 channel. In addition, position determination devices that use the WAAS do not need an additional antenna and receiver since the GPS antenna and receiver are used to pick up the WAAS signal.

However, prior art systems are designed either to receive and process WAAS signals (on the existing L1 receiver of the GPS position determination device), or to receive and process RTCM signals (using a radio receiver operating in the 300 KHz range), or receive and process correction data in a particular manufacturer's format (typically at a frequency in the unlicensed frequency band). Thus, prior art systems that use a particular manufacturer's format are not RTCM compatible. That is, they cannot use RTCM signals for accurately determining position. In addition, systems that are designed to receive and process WAAS signals are not RTCM compatible (they cannot use RTCM signals for accurately determining position).

What is needed is a position determination system that is easily moved from place to place, that is easy to use, and can use RTCM correction data when it is available and when it is required for accurately determining position. Also, what is needed is a way to obtain correction data from RTCM signals on a position determination device that is designed to receive correction data on unlicensed radio frequencies. In addition, a way to obtain correction data using RTCM signals on a position determination device that is designed to receive correction data in a format unique to a particular manufacturer is needed. In addition, a way to obtain correction data using RTCM signals on a position determination device that is designed to receive WAAS signals is needed. Furthermore, a position determination device that is easy to use and operate is required.

DISCLOSURE OF THE INVENTION

The present invention provides a method and apparatus that allows a position determination device adapted to receive correction signals on frequencies other than the RTCM transmission frequencies to use RTCM correction data to more accurately determine position.

In one embodiment of the present invention, a signal conversion device is disclosed that is adapted to receive RTCM signals. The RTCM signals are received, and demodulated so as to obtain the RTCM correction data. The RTCM correction data is then modulated to a second frequency. The correction signals are then transmitted by the signal conversion device at the second frequency such that they may be received by a position determination device that is designed to receive correction data at the second frequency. The position determination device then uses the RTCM correction data to accurately determine position.

The signal conversion device and the position determination device make up a position determination system that is easy to carry around and easy to use. In one embodiment, the signal conversion device includes a format converter for converting received RTCM signals into a format adapted to be received by a particular position determination device. In one embodiment, the format converter converts the RTCM signals into a WAAS format. In an alternate embodiment, the RTCM signals are converted into a particular manufacturer's format.

The signal conversion device is a separate unit that couples data to a position determination device via a wireless link. In effect, the signal conversion device acts as a local beacon, transmitting RTCM correction data that it has received at a desired frequency and format. Since the signal conversion device is totally separate from the position determination device, it may be used as necessary to couple correction data to a position determination device. Thus, a position determination device that is quite compact may be used, eliminating the need for bulky systems that are connected via cable. In one embodiment, the position determination device is a handheld unit and the signal conversion device is small enough to be worn comfortably around a user's belt. Thus, a user may carry around the small, compact, position determination device for applications that do not require RTCM correction data for accurately determining position. When RTCM correction data is required, the user simply uses the converter. RTCM correction data is then coupled via the converter to the position determination device.

The frequency and the format transmitted by the converter are adapted to meet the needs of the various position determination devices. Thus, for conveying RTCM correction data to a position determination device that uses a particular manufacturer's format, a converter that translates the RTCM signal into the particular manufacturer's format is used. For position determination devices that receive and process WAAS signals, a converter that converts the RTCM signal into a WAAS format is used. This allows for configuring a system flexibly to the needs of a particular user and a particular position determination device, and provides for the manufacture of a small handheld position determination device that has sophisticated capabilities.

These and other objects and advantages of the present invention will no doubt become obvious to those of ordinary skill in the art after having read the following detailed description of the preferred embodiments that are illustrated in the various drawing figures.

BRIEF DESCRIPTION OF THE DRAWINGS

The accompanying drawings, that are incorporated in and form a part of this specification, illustrate embodiments of the invention and, together with the description, serve to explain the principles of the invention.

BEST MODE FOR CARRYING OUT THE INVENTION

Figure 1:
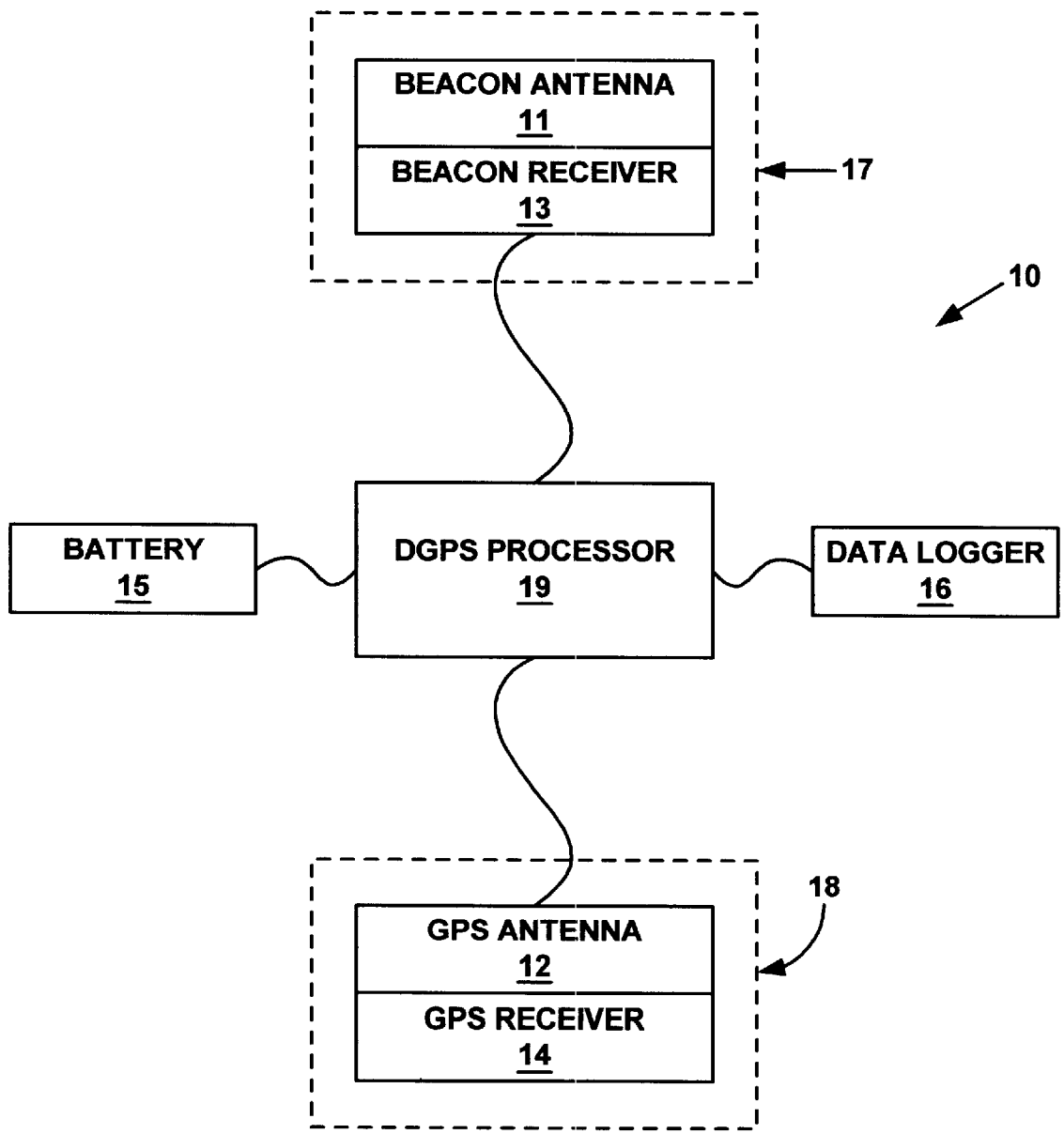
FIG. 1 (Prior Art) is a schematic diagram of the components of a prior art position determination system.
Figure 2:
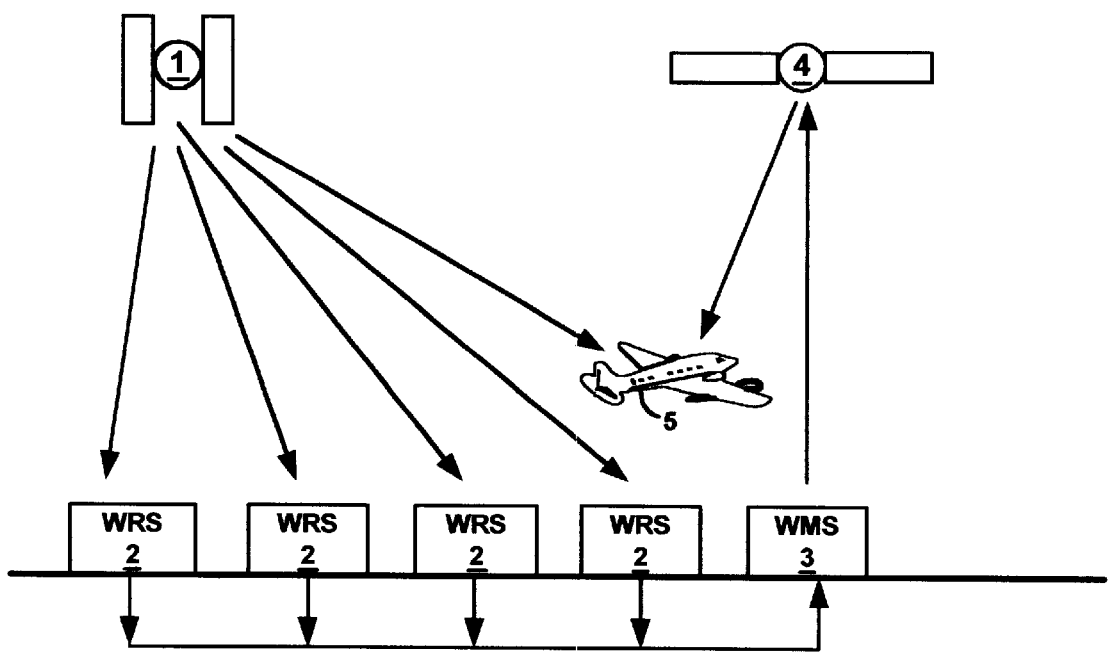
FIG. 2 (Prior Art) is a diagram of a prior art aircraft that is using satellites of the GPS and WAAS signals to determine position.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations of data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "designating," "incorporating," "calculating," "determining," "communicating," or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system's memories or registers or other such information storage, transmission, or display devices. Thus, the present invention is also well suited to the use of general purpose computer systems and other computer systems such as, for example, optical and mechanical computers.

Figure 3:
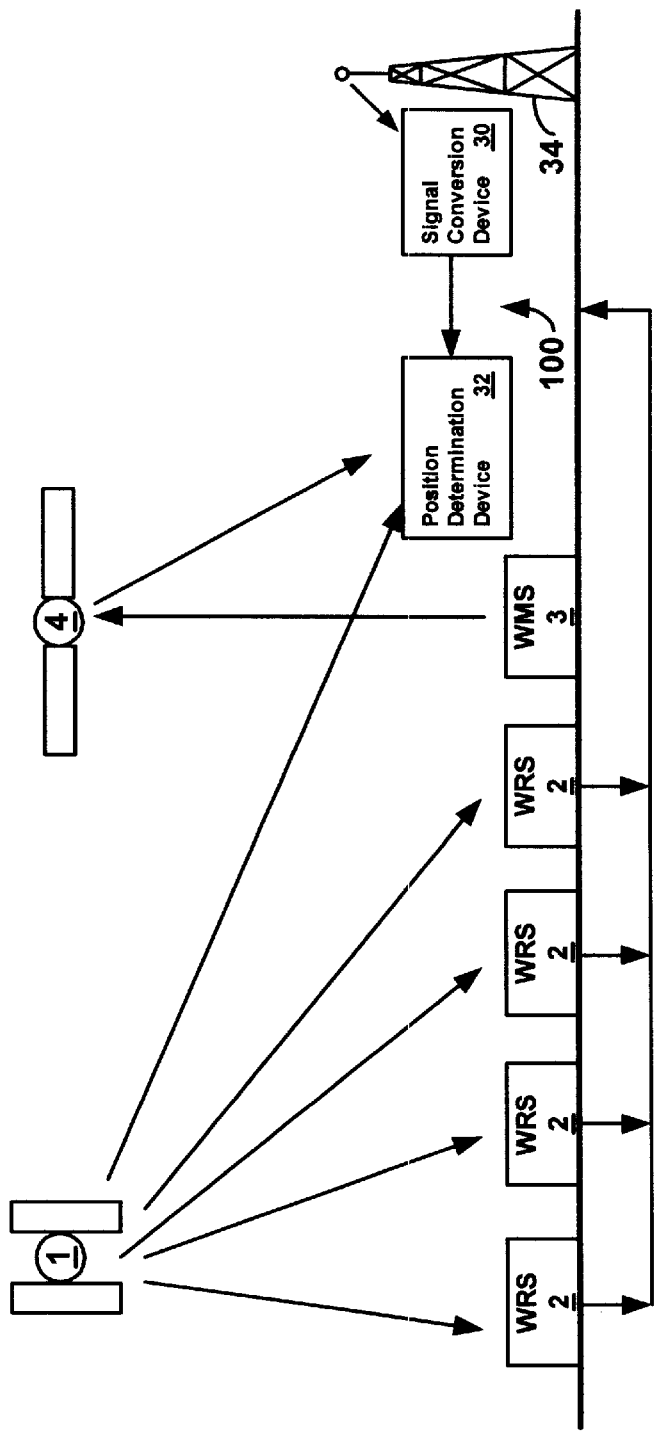
FIG. 3 is a position determination system that uses RTCM signals, signals from GPS satellites, and signals from WAAS satellites to determine position in accordance with the present claimed invention.

Referring now to FIG. 3, a position determination system 100 that includes signal conversion device 30 and position determination device 32 is shown. Stations that transmit RTCM signals transmit within a frequency band of 283.5 to 325 KHz. Each RTCM transmission station typically transmits at its own frequency within this frequency band. Signal conversion device 30 receives RTCM signals from RTCM transmission stations such as RTCM transmission station 34. Signal conversion device 30 demodulates the RTCM signals so as to obtain RTCM correction data. The RTCM correction data is then converted to a frequency adapted to be received by a position determination device and is retransmitted. The signal transmitted by signal conversion device 30 is received by position determination device 32 that uses the RTCM correction data to accurately determine position.

Continuing with FIG. 3, position determination device 32 may use any number of different sources of position determination data in order to calculate position. With any example illustrated in FIG. 3, position determination device 32 uses data from GPS satellite 1 (along with data from other GPS satellites that are not shown) to determine position. In addition, position determination device 32 may use correction data transmitted in the WAAS signal for determining position.

Figure 4:
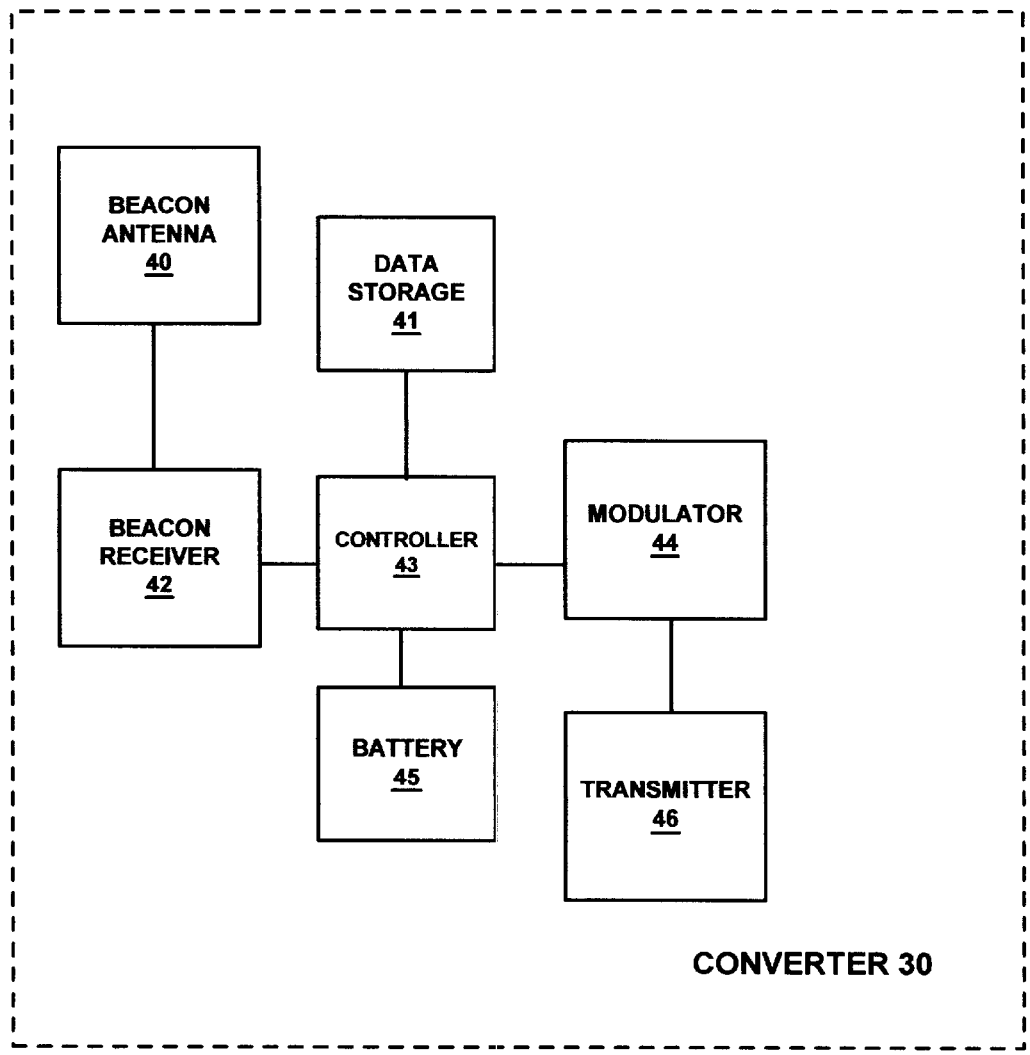
FIG. 4 is a schematic diagram illustrating a converter in accordance with the present claimed invention.

FIG. 4 shows converter 30 to include beacon antenna 40 that is coupled to beacon receiver 42. In one embodiment, beacon antenna 40 is formed of crossed ferrite rods. However, any number of different types of antennas could be used for receiving RTCM signals. Converter 30 also includes controller 43 that controls the operations of converter 30. Battery 45 provides power to the other components of converter 30. Data storage 41 stores data as required for the operation of converter 30. In one embodiment, data storage 41 is a random access memory device; however, any number of other types of memory devices such as, for example, flash memory devices can also be used. Also coupled to controller 43 is modulator 44 that couples to transmitter 46.

Figure 5:
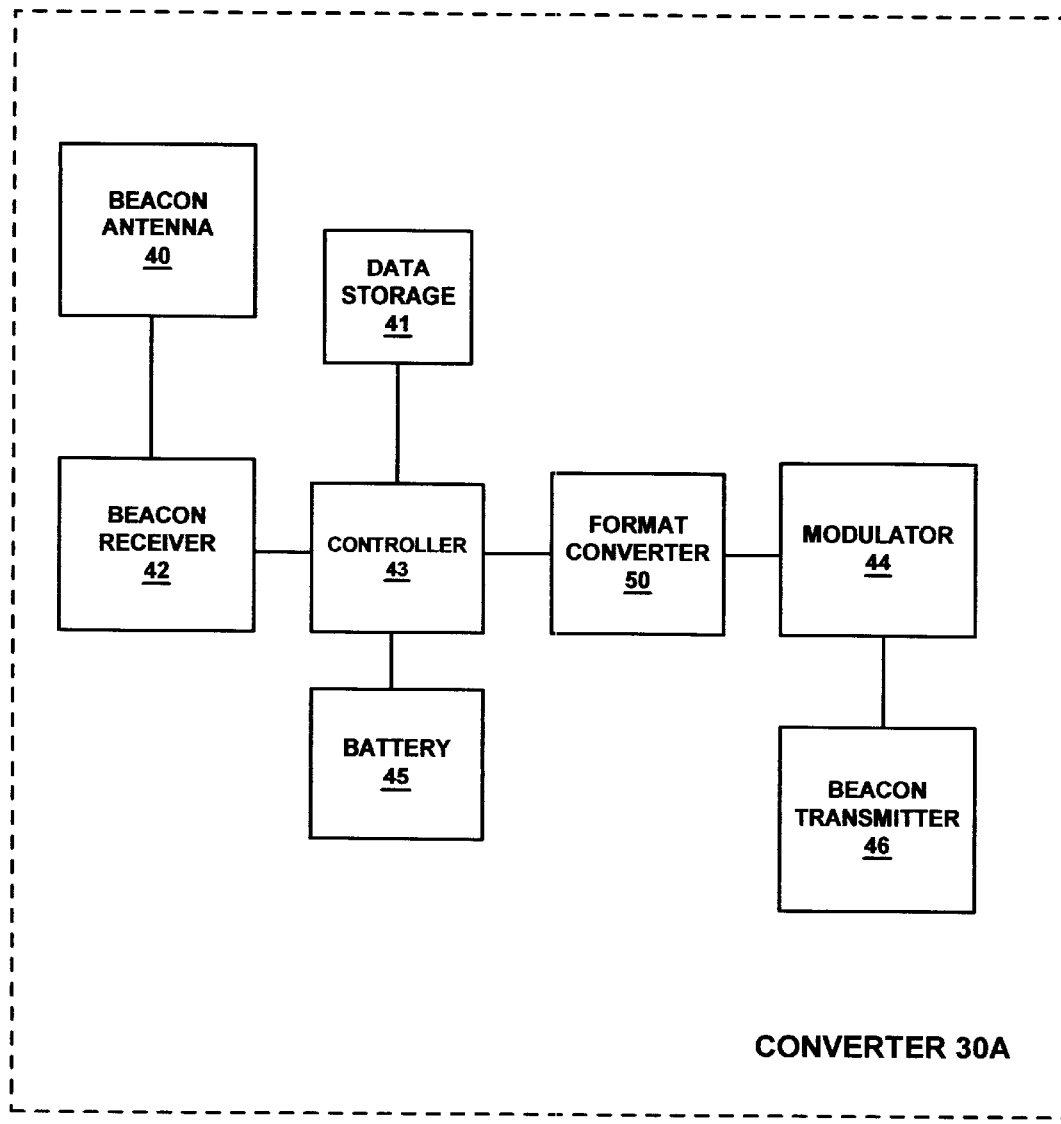
FIG. 5 is a schematic diagram illustrating a converter that includes format conversion capabilities in accordance with the present claimed invention.

FIG. 5 shows an embodiment in which the converter, shown as converter 30A, includes format converter 50. Format converter 50 is shown to be coupled to controller 43 and to modulator 44. Format converter 50 operates in conjunction with controller 43 and data storage 41 for converting data that is received in the RTCM transmission format into a different format. In one embodiment, format converter 50 converts RTCM correction data into a WAAS format. Alternatively, format converter 50 may convert the RTCM correction data into a particular manufacturer's format.

Figure 6:
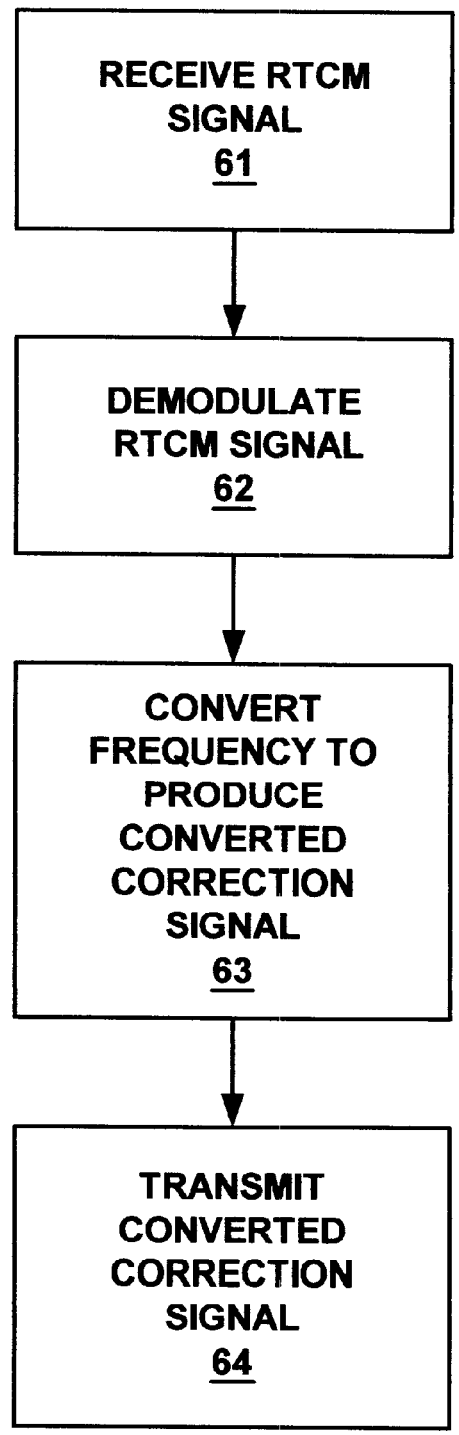
FIG. 6 is a diagram illustrating a method of converting RTCM signals into a frequency adapted to be received by a position determination device in accordance with the present claimed invention.

With reference next to FIG. 6, a flow chart illustrating a method of providing RTCM correction data to position determination device is shown. As shown by step 61, RTCM signals are received by the converter. In the embodiments shown in FIGS. 4–5, RTCM signals are received by beacon antenna 40 and are coupled to beacon receiver 42. Next, the RTCM signals are demodulated as shown by step 62. In the embodiments shown in FIGS. 4–5, beacon receiver 42 demodulates the RTCM signals so as to obtain RTCM correction data that is then coupled to modulator 44.

Continuing with FIG. 6, the RTCM correction data is converted to a different frequency as shown by step 63. In the embodiment shown in FIGS. 4–5, modulator 44 modulates the RTCM correction data to the desired frequency so as to produce a converted correction signal. The converted correction signal is then transmitted as shown by step 64. In the embodiment shown in FIGS. 4–5, the converted correction signal is transmitted by transmitter 46. In one embodiment, the converted correction signal is modulated to a radio frequency that does not require a license (an unlicensed frequency). However, any desired frequency available for this type of service could be used. In one embodiment a frequency of 2.4 GHz is used. In an alternate embodiment, a frequency of 918 MHz is used.

Figure 7:
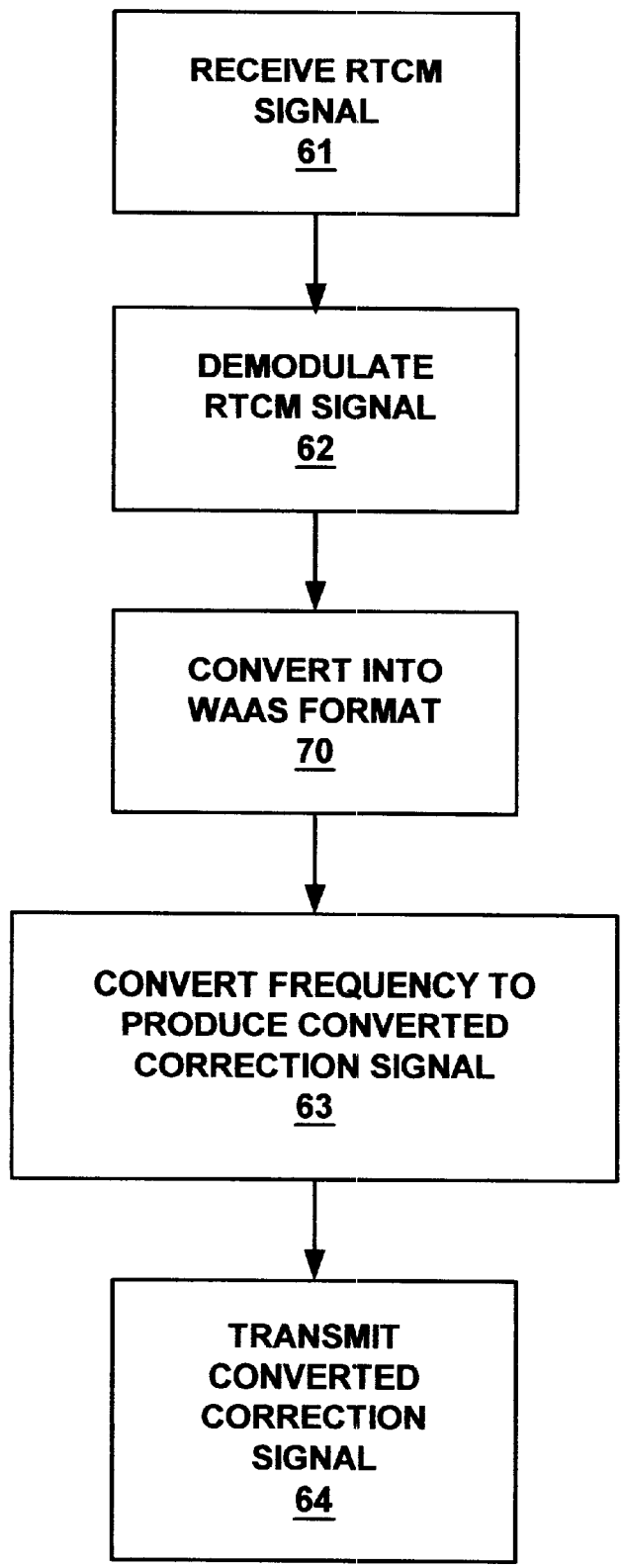
FIG. 7 is a diagram showing a method of converting RTCM signals into a WAAS format and into a frequency adapted to be received by a position determination device in accordance with the present claimed invention.

In an alternate embodiment, the RTCM correction data is converted into a different transmission format such that it may be readily received by a position determination device. Referring now to FIG. 7, RTCM signals received in step 61 are demodulated, as illustrated by step 62, so as to yield RTCM correction data. The RTCM correction data is then converted into the desired format.

Figure 8:
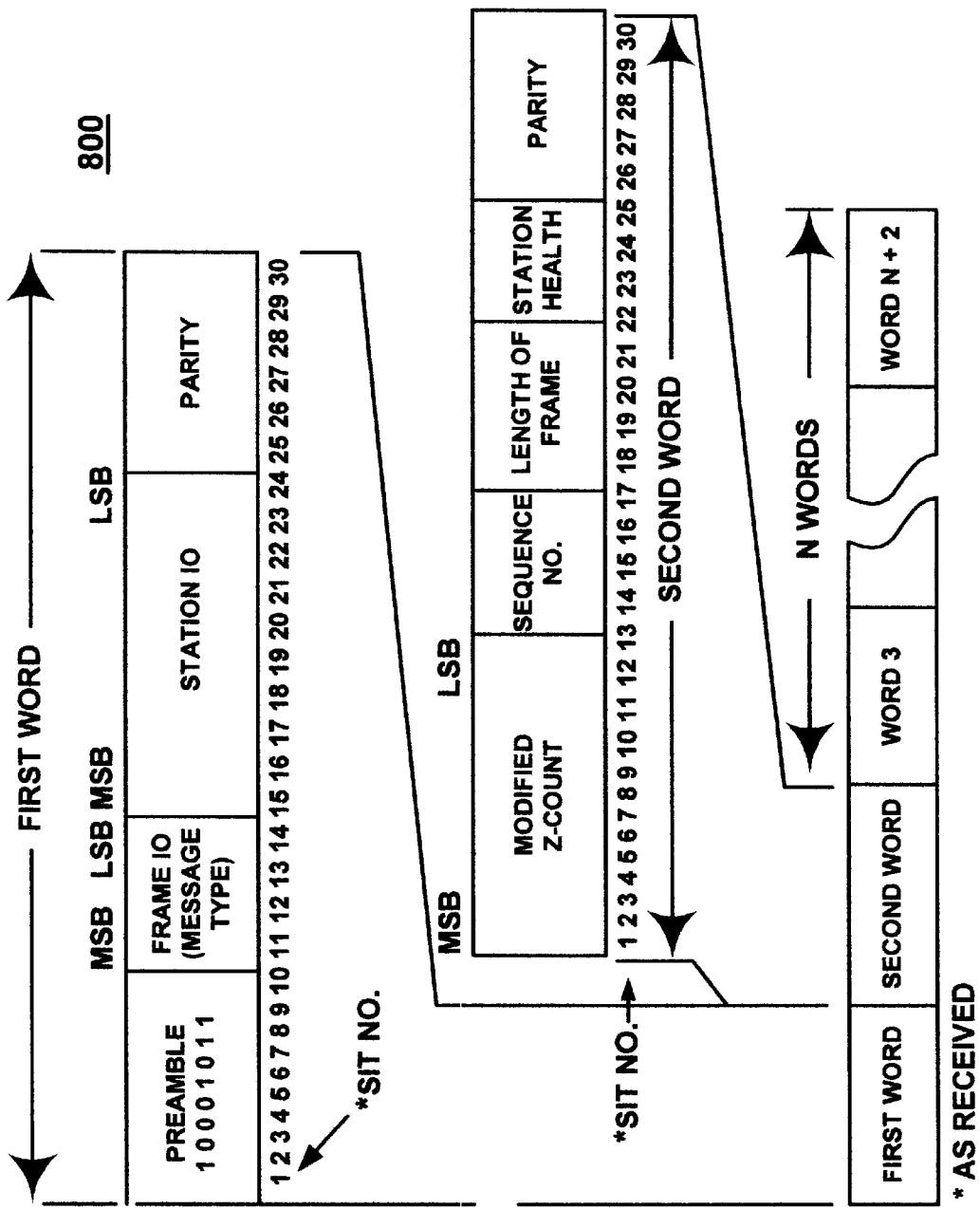
FIG. 8 shows the basic RTCM data format of the first two words of a RTCM message.

In the embodiment shown in FIG. 7, RTCM correction data is converted from the RTCM format into the WAAS format. Referring now to FIG. 8, the basic format for the first two words of an RTCM message is shown. Each RTCM message frame is made up of several 30 bit words, always headed by two standard words that are shown in FIG. 8. The first word provides the following, as shown: an 8 bit fixed preamble; a 4 bit message identifier; a 12 bit station identifier; and 6 parity bits. The second word provides the following: 16 bits of timing data (modified z count and sequence number); 5 bit message frame length; 3 bit station health information; and 6 parity bits. The number of following words in an RTCM message can vary from zero to 31 depending on the message type and the number of GPS satellites in view of the RTCM ground reference station.

Figure 9:
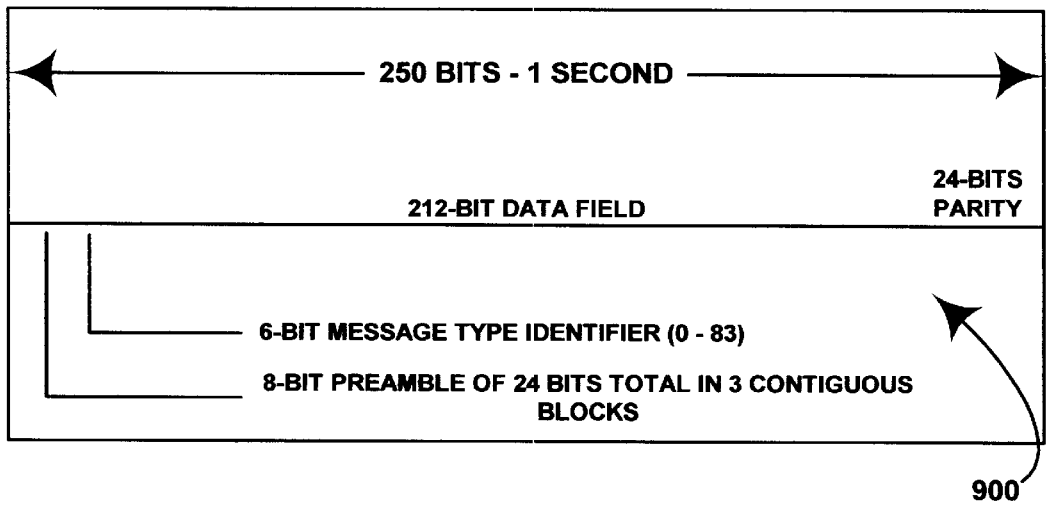
FIG. 9 shows the basic WAAS data format.

Referring back to FIG. 7, in step 70, the received RTCM correction data is converted into a WAAS format. In so doing, all of the information contained in the RTCM message is retained and converted into the WAAS format. Referring now to FIG. 9, the basic WAAS data format is shown. In general, the WAAS message format and overall system specifications are determined by the FAA and are well known in the GPS products industry. The WAAS message 900 contains separate corrections for each GPS satellite. The WAAS messages also carry estimates of the distortions caused by the earth's ionosphere for a "grid" of locations across North America. The WAAS message is broadcast at a data rate of approximately 250 bits per second, and a WAAS message stream carries corrections for all 24 GPS satellites. The basic WAAS message is 250 bits in length. Each WAAS message block comprises the following, as shown: an 8 bit preamble; a 6 bit message type; a 212 bit data field; and a 24 bit cyclic redundancy check parity. The 8 bit preamble is actually a 24 bit preamble distributed across 3 successive message blocks. The message type field is 6 bits long, which allows for 64 different messages.

Still referring to FIG. 9, each basic WAAS message shares the basic format shown in FIG. 9. As previously discussed, a WAAS message includes correction data for all 24 GPS satellites. A typical RTCM message only includes correction data relating to satellites observed by the RTCM reference station at any particular time. Thus, the translated correction message will only contain data relating to those satellites observed by the RTCM reference station.

Referring back to FIG. 7, after the RTCM correction data is translated into the WAAS format, as shown by step 63, the frequency is converted to produce a converted correction signal which is then transmitted as shown by step 64. In one embodiment, the transmission is in the very high frequency (VHF) range and is at a frequency that is in the unlicensed frequency band. In one specific embodiment, the transmission is at a frequency of 2.4 GHz. In an alternate embodiment, a frequency of 918 MHz is used.

Alternatively, the WAAS formatted message is modulated as required by the WAAS transmission format (a CDMA modulated signal that is modulated to the L1 frequency). The signal is then transmitted on the L1 frequency. In an embodiment where the converted correction signal is transmitted on the L1 frequency, there is no need for a separate beacon antenna and beacon receiver in the position determination device. This results in a less expensive position determination device and position determination system.

In one embodiment, the signal includes a layer of error correction data. This layer of correction data is added on top of the RTCM signals. The content and format is dependent on the nature and extent of correction data available in a particular area or application. However, in one embodiment, an error correction protocol conforming to the MNP10 standard is used. However, other well known protocols may also be used.

Figure 10:
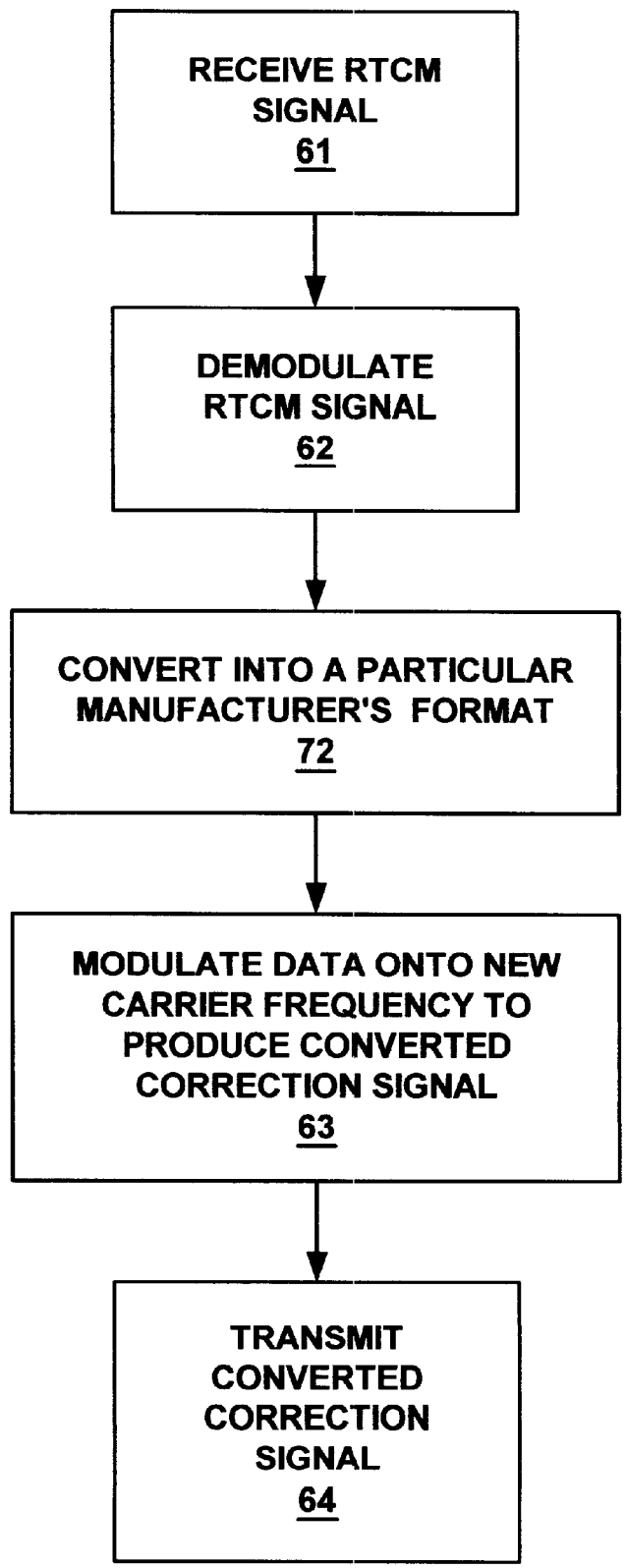
FIG. 10 is a diagram showing a method of converting RTCM signals into a particular manufacturer's format and into a frequency adapted to be received by a position determination device in accordance with the present claimed invention.

In the embodiment shown in FIG. 10, data is converted into the particular manufacturer's format. In this embodiment, RTCM signals are received as shown by step 61 and are demodulated as shown by block 62 so as to obtain RTCM correction data. The RTCM correction data is converted into a particular manufacturer's format as shown by step 72. The correction data is then modulated to a frequency adapted to be received by a position determination device as shown by step 63 so as to produce a converted correction signal. The converted correction signal is then transmitted as shown by step 64.

Figure 11:
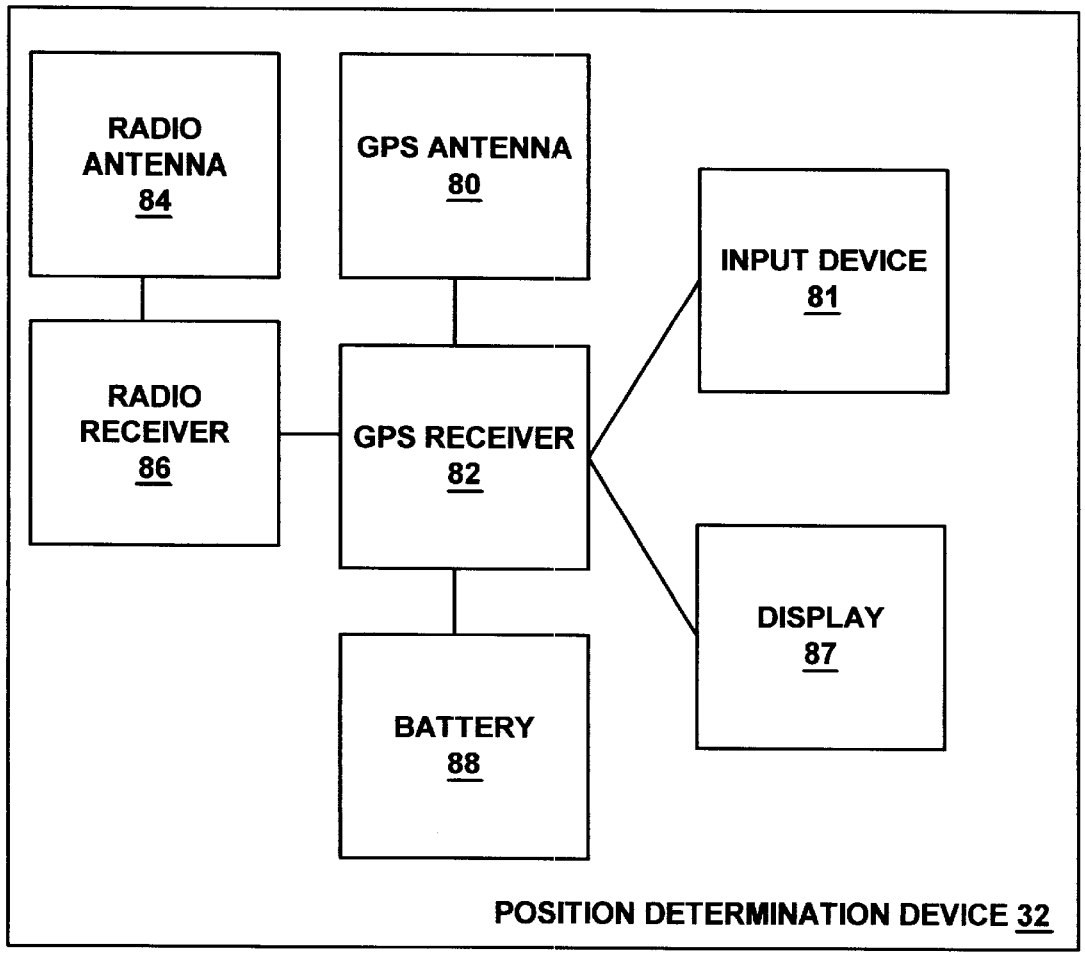
FIG. 11 is a schematic diagram showing a position determination device that includes a radio antenna and receiver adapted to receive correction data in accordance with the present claimed invention.

FIG. 11 shows position determination device 32 to include radio antenna 84 that is coupled to radio receiver 86. Position determination device 32 also includes a GPS antenna 80 that is coupled to GPS receiver 82. Battery 88 provides power to the position determination device 32. Display 87 is also coupled to GPS receiver 82. Display 87 may be any of a number different types of display devices such as, for example, a Liquid Crystal Display (LCD), a thin Cathode Ray Tube, or other display device suitable for creating graphic images and alphanumeric characters recognizable to the user. Input device 81 allows user to input data into position determination device 32. In one embodiment, input device 81 is a alphanumeric keypad that includes a number of function keys that operates in conjunction with display 87 so as to allow user to input data.

Referring still to FIG. 11, in operation, position determination data is received from satellites of the GPS by GPS antenna 80. The position determination data is coupled to GPS receiver 82 for determining position. Converted correction signals are received by radio antenna 84 and are coupled to it radio receiver 86. Radio receiver 86 demodulates the converted correction signals to obtain RTCM correction data that is coupled to GPS receiver 82. The RTCM correction data is then used in conjunction with the received position determination data to more accurately determine position.

In one embodiment, both RTCM correction data and received WAAS correction data is used to calculate position. In one embodiment, this is done by switching back and forth automatically between RTCM correction data and WAAS correction data.

Figure 12:
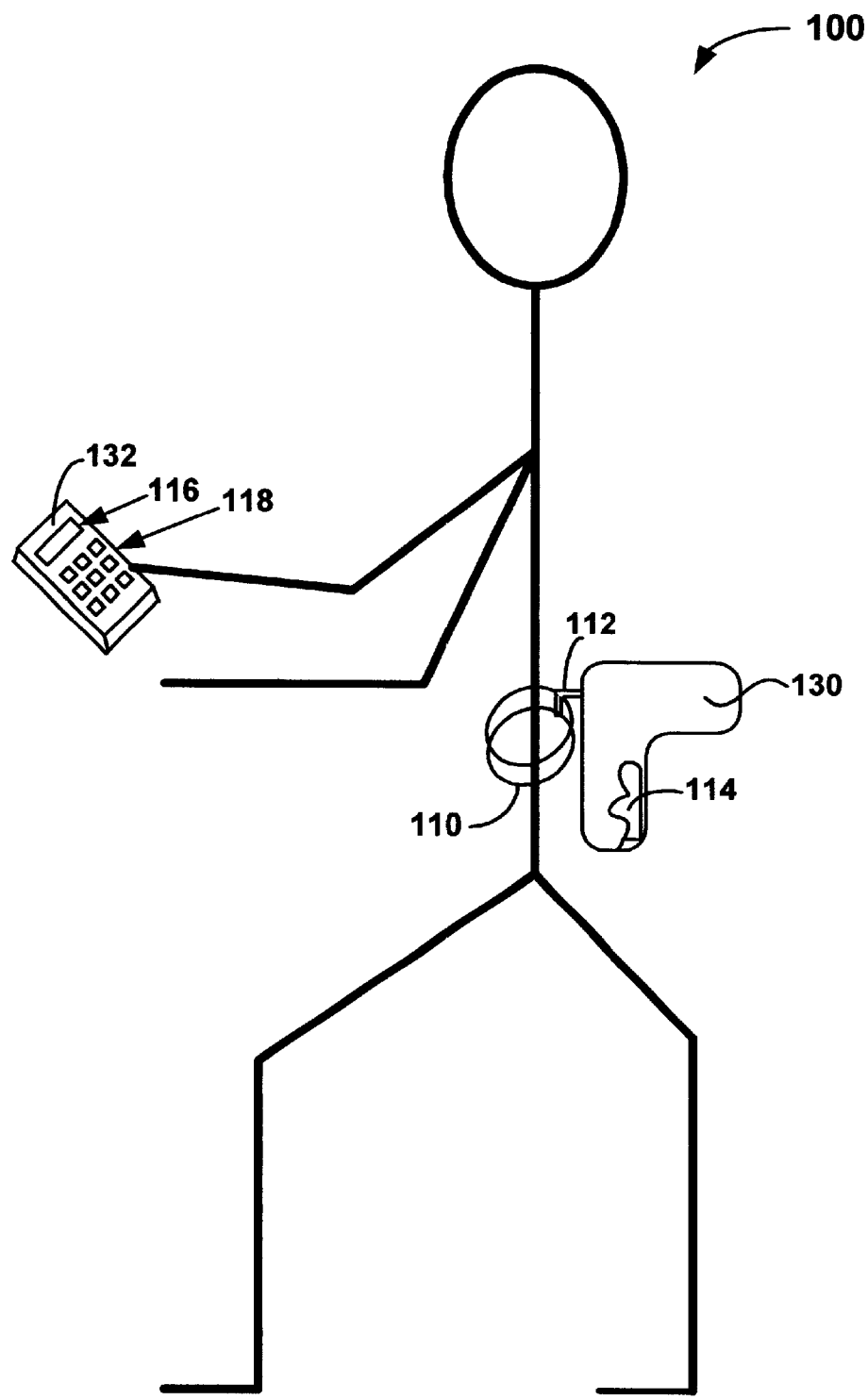
FIG. 12 shows a side view of a specific implementation in which the converter is adapted to fit onto a user's belt and in which the position determination device is a handheld unit.

FIG. 12 shows a specific implementation in which position determination system 100 includes a converter 130 that fits on a user's belt and a position determination device 132 that is small enough to fit in a user's hand. In one embodiment, position determination device 132 includes a display 116 and function keys 118. In this embodiment, converter 130 is roughly L-shaped with horizontal and vertical segments. The beacon antenna and some of the other electronic components are positioned in the horizontal segment, and the remaining electronic components and the batteries 114 are located in the vertical segment. A belt clip 112 attaches to the housing of converter 130 for coupling converter 130 to a belt such as belt 110.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A signal conversion device comprising:
    a radio receiver adapted to receive correction signals that are formatted in a RTCM format and that are transmitted over a first frequency;
    a format converter coupled to said radio receiver and adapted to convert received correction signals into converted correction data, said converted correction data in a format adapted to be received by a position determination device;
    a modulator coupled to said format converter and coupled to said transmitter for modulating said converted correction data to a second frequency;
    a transmitter coupled to said format converter, said transmitter for transmitting said converted correction signals at said second frequency so as to generate a local beacon; and
    a housing adapted to be carried on a user, said radio receiver, said format converter, said modulator, and said transmitter disposed in said housing.

2. The signal conversion device of claim 1 wherein said format converter is adapted to convert correction signals that are in a RTCM format into a WAAS format.

3. The signal conversion device of claim 1 wherein said format converter is adapted to convert correction signals that are in a RTCM format into a particular manufacturer's format.

4. The signal conversion device of claim 1 wherein said modulator is adapted to modulate converted correction data into a frequency that is in an unlicensed frequency band.

5. The signal conversion device of claim 1 wherein said modulator is adapted to modulate converted correction data into a frequency in the order of 2.4 Gigahertz.

6. The signal conversion device of claim 1 wherein said modulator is adapted to modulate converted correction data into a frequency in the order of 918 MegaHertz.

7. A position determination system comprising:

a signal conversion device including an antenna adapted to receive RTCM signals that include RTCM correction data, said signal conversion device including a radio receiver coupled to said antenna for demodulating said RTCM signals so as to obtain RTCM correction data, a modulator coupled to said radio receiver for modulating said RTCM correction data into a frequency adapted to be received by a position determination device so as to produce a converted correction signal, and a transmitter for transmitting said converted correction signal so as to generate a local beacon, said signal conversion device including a housing adapted to be carried on a user, said antenna, said radio receiver, said modulator, said transmitter, and said controller disposed within said housing; and a hand-held position determination device that is adapted to receive said converted correction signal transmitted by said signal conversion device, said position determination device adapted to use said converted correction signal for accurately determining position.

8. The position determination system of claim 7 wherein said position determination device receives data from satellites of the Global Positioning System for determining position.

9. The position determination system of claim 7 further comprising:

a format converter coupled to said radio receiver for converting said RTCM correction data into a WAAS format.

10. The position determination system of claim 9 wherein said format converter is coupled to said modulator, and wherein said modulator is operable to modulate said correction data as required by said WAAS format.

11. The position determination system of claim 7 further comprising:

a format converter coupled to said radio receiver for converting said RTCM correction data into a particular manufacturer's format, said format converter coupled to said modulator such that received correction data is modulated as required by said particular manufacturer's format.

12. The signal conversion device of claim 7 wherein said modulator converts received RTCM signals into a frequency that is in an unlicensed frequency band.

13. The signal conversion device of claim 7 wherein said modulator converts received RTCM signals into a frequency in the range of 2.4 Gigahertz.

14. The signal conversion device of claim 7 further comprising a controller for controlling operations.

15. A method for providing RTCM correction data to a position determination device comprising:

receiving RTCM signals containing RTCM correction data at a signal conversion device that is adapted to be carried on a user;

demodulating said RTCM signals at said signal conversion device so as to obtain RTCM correction data;

converting said RTCM correction data, at said signal conversion device, into a WAAS format;

converting said RTCM correction data, at said signal conversion device, into a frequency adapted to be received by a position determination device so as to produce a converted correction signal; and transmitting, from said signal conversion device, said converted correction signal so as to generate a local beacon.

* * * * *